United States Patent
Yamanouchi et al.

(10) Patent No.: US 11,230,211 B2
(45) Date of Patent: Jan. 25, 2022

(54) HANGING STRAP FOR VEHICLE

(71) Applicant: Toyota Jidosha Kabushiki Kaisha, Toyota (JP)

(72) Inventors: Yuchi Yamanouchi, Toyota (JP); Masaki Shitara, Nagakute (JP); Ryo Hattori, Kariya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 16/910,951

(22) Filed: Jun. 24, 2020

(65) Prior Publication Data
US 2020/0406801 A1    Dec. 31, 2020

(30) Foreign Application Priority Data
Jun. 28, 2019   (JP) .............................. JP2019-121326

(51) Int. Cl.
*B60N 3/02*     (2006.01)
(52) U.S. Cl.
CPC .................................... *B60N 3/026* (2013.01)
(58) Field of Classification Search
CPC .................................. B60N 3/02; B60N 3/023
USPC ......................................... 296/1.02; 105/354
See application file for complete search history.

(56) References Cited

U.S. PATENT DOCUMENTS

| | | | | |
|---|---|---|---|---|
| 615,986 A | * | 12/1898 | Hendrickson | B60N 3/02 105/354 |
| 863,935 A | * | 8/1907 | Newton | B60N 3/02 105/354 |
| 947,022 A | * | 1/1910 | Newton | B60N 3/02 105/354 |
| 1,065,930 A | * | 7/1913 | Farmer | B60N 3/02 105/354 |
| 1,182,467 A | * | 5/1916 | Flocker | B60N 3/02 105/354 |
| 1,229,230 A | * | 6/1917 | Chapelle | B60N 3/02 105/354 |
| 2,500,415 A | * | 3/1950 | Johnson | B60N 3/023 105/354 |
| 2009/0134613 A1 | * | 5/2009 | Eber | B60N 3/026 280/748 |
| 2018/0162254 A1 | * | 6/2018 | Strong | B60N 3/02 |

FOREIGN PATENT DOCUMENTS

JP          H0592037 U      12/1993
JP          2002-337591 A   11/2002

* cited by examiner

*Primary Examiner* — Jason S Morrow
(74) *Attorney, Agent, or Firm* — Dinsmore & Shohl LLP

(57) ABSTRACT

A hanging strap for a vehicle includes: a leather belt having a loop shape, that is hung from a support provided near a ceiling in a vehicle cabin; and a hand grip member that is supported on the leather belt and that has a grip portion gripped by a standing passenger. The hand grip member is placed at an inner circumferential side of the leather belt. An outer surface of the grip portion is fixed to an inner surface of the leather belt.

7 Claims, 9 Drawing Sheets

HANGING STRAP FOR VEHICLE

CROSS REFERENCE TO RELATED APPLICATION

This application claims priority to Japanese Patent Application No. 2019-121326 filed on Jun. 28, 2019, which is incorporated herein by reference in its entirety including the specification, claims, drawings, and abstract.

TECHNICAL FIELD

The present disclosure relates to a hanging strap for a vehicle, for supporting a standing passenger in a shared vehicle or the like.

BACKGROUND

As disclosed in, for example, JP 2002-337591 A, in a shared vehicle, a support (support pipe) is provided near a ceiling of a vehicle cabin, extending in a front-and-rear direction of the vehicle. A hanging strap (which is also commonly called a strap) which is a supporting tool for standing passengers is hung on this support.

For example, FIG. 8 exemplifies a hanging strap 100 of the related art. FIG. 9 shows a cross section along a D-D line of FIG. 8. The hanging strap 100 includes a leather belt 110 and a hand grip member 120. The leather belt 110 having an elongated shape is suspended around a support 130. Further, an end 112 of the leather belt 110 is inserted into a slot 124 below a support bar 122 (refer to FIG. 9) of the hand grip member 120.

Then, the end 112, the other end 114, and an intermediate portion 116 of the leather belt 110 are sandwiched by hanging strap holders 140A and 140B. In this state, a pair of screws 142 are screwed into the hanging strap holders 140A and 140B.

By the end 112 and the other end 114 of the leather belt 110 being screwed and held together, the leather belt 110 is formed into a loop shape. Further, with the end 112 and the other end 114, and the intermediate portion 116 opposing the ends 112 and 114 being screwed and held together, the loop-shaped leather belt 110 is divided into a loop L1 surrounding the support 130 and a loop L2 surrounding the support bar 122 of the hand grip member 120.

In the structure of FIGS. 8 and 9, for example, when a load in a vertically downward direction is input from a passenger (standing passenger) to the hand grip member 120, the load is concentrated on the support bar 122, which causes the hand grip member 120 to be supported by the leather belt 110. Thus, it is necessary to set a large diameter for the support bar 122 to tolerate this load, and there still remains room for improvement in, for example, improving a degree of freedom of design in the hanging strap 100 of the related art.

An advantage of the present disclosure lies in provision of a hanging strap for a vehicle, which can suppress load concentration of the hand grip member as compared to the related art.

SUMMARY

According to one aspect of the present disclosure, there is provided a hanging strap for a vehicle, comprising: a leather belt of a loop shape, that is hung from a support provided near a ceiling in a vehicle cabin; and a hand grip member that is supported on the leather belt and that has a grip portion gripped by a standing passenger. The hand grip member is placed at an inner circumferential side of the leather belt. Further, an outer surface of the grip portion is fixed to an inner surface of the leather belt.

According to the structure described above, when a load in a vertically downward direction is input from the standing passenger to the grip portion, the load is received by the entire outer surface of the grip portion fixed to the inner surface of the leather belt, and, therefore, the load concentration on the hand grip member can be suppressed.

According to another aspect of the present disclosure, in the hanging strap for the vehicle, the leather belt may have a portion to be supported through which the support passes. The hand grip member may have an arm portion which extends, at an inner circumferential side of the leather belt, from the grip portion toward the portion of the leather belt to be supported. In this case, a side surface, of the arm portion, opposing the leather belt is fixed to the inner surface of the leather belt.

According to the structure described above, because the leather belt is supported by the arm portion, flexure (play) of the leather belt can be consequently reduced, and the standing passenger can be stably supported.

According to another aspect of the present disclosure, the hanging strap for the vehicle may further comprise a hanging strap holder that holds opposing portions, of the leather belt, between the portion to be supported and a portion where the hand grip member is placed. In this case, the opposing portions of the leather belt are held on the hanging strap holder with a spacer therebetween, the spacer being equal in width to the arm portion.

According to the structure described above, when the leather belt is held, because the spacer being equal in width to the arm portion is provided therebetween, a necking shape of the leather belt at the location to be held can be suppressed, and a straight-line design of the leather belt can be constructed from the arm portion to the hanging strap holder. In addition, according to the structure described above, the leather belt is held with the spacer therebetween; that is, in a state of being separated in advance. When the standing passenger holds onto the hanging strap, the hanging strap receives a load in the vertically downward direction. If there is no spacer and the opposing leather belt portions are bundled, piled, and fastened, with the reception of the downward load as described above, a load is applied to the hanging strap to separate the leather belt portions; that is, a load is applied to loosen the fastening of the hanging strap. According to the structure described above, because the spacer is placed between the leather belt portions to separate the leather belt portions in advance, the input of the load to loosen the fastening of the hanging strap as described above can be suppressed.

According to another aspect of the present disclosure, a starting end and a completing end of the leather belt may be overlapped and held by the hanging strap holder. In this case, the starting end of the leather belt extending in an upward direction through the grip portion and the arm portion may be placed at an outer side in relation to the completing end.

According to the structure described above, because a break of the completing end is hidden by the starting end, the break of the completing end cannot be viewed from the standing passenger, and the design can be improved.

According to another aspect of the present disclosure, a guide groove into which the leather belt is fitted may be formed on outer surfaces of the grip portion and the arm portion.

According to the structure described above, by providing the guide groove into which the leather belt is fitted, detachment of the leather belt from the grip portion and the arm portion can be suppressed.

According to the hanging strap for the vehicle of the present disclosure, the load concentration on the hand grip member can be suppressed as compared to the related art.

BRIEF DESCRIPTION OF DRAWINGS

Embodiment(s) of the present disclosure will be described based on the following figures, wherein.

DESCRIPTION OF EMBODIMENTS

A structure of a vehicle equipped with a hanging strap 10 for a vehicle according to an embodiment of the present disclosure will now be described with reference to the drawings. In FIGS. 1 to 7, a front-and-rear direction of the vehicle body is shown by an axis represented by reference sign FR, a vehicle width direction is shown by an axis represented by reference sign LH (Left Hand), and a vehicle height direction is shown by an axis represented by reference sign UP. The vehicle body front-and-rear axis FR has a vehicle body front direction as a positive direction. The vehicle width axis LH has a left side in the vehicle width direction as a positive direction. The vehicle height axis UP has an upward direction as a positive direction. These three axes are orthogonal to each other.

In the following, unless otherwise noted, the front direction in the vehicle body front-and-rear direction is simply described as "front", and the rear direction in the vehicle body front-and-rear direction is simply described as "rear". Similarly, the upward direction in the vehicle height direction is simply described as "upward", and the downward direction in the vehicle height direction is simply described as "downward". With regard to a right direction and a left direction of the vehicle, these directions are along the LH axis shown in FIG. 1 and the like.

Figure 1:
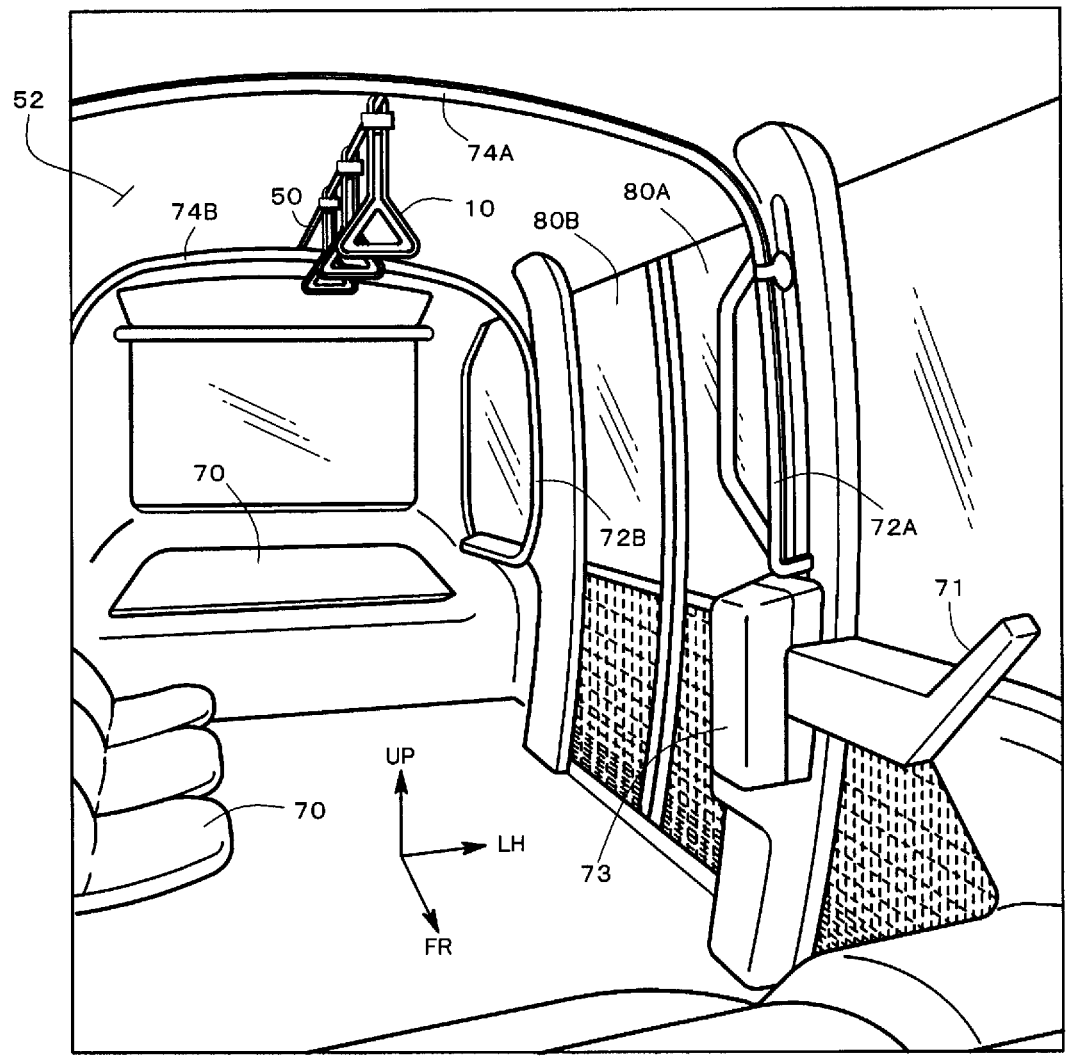
FIG. 1 is a perspective diagram exemplifying a vehicle cabin in which a hanging strap according to an embodiment of the present disclosure is provided.

FIG. 1 is a perspective diagram exemplifying an inside of a vehicle cabin. More specifically, FIG. 1 is a perspective diagram exemplifying a view from a center of the vehicle cabin toward the rear side.

For example, this vehicle has an automatic drive function. The vehicle can be operated from level 0 (a driver executes all operations) to level 5 (completely automated driving), based on the standards by the Society of Automotive Engineers (SAE) of the United States of America. For example, in level 4 (advanced automated driving), while completely automated driving is executed within a limited area, vehicle traveling by a driver is required outside of the limited area. In level 5, automated driving which in all situations does not require the driver (completely automated driving) is executed.

The vehicle is a shared vehicle having the automatic driving function. That is, the vehicle is used, for example, as a bus which travels with passengers riding in the vehicle cabin while traveling in automated driving along a pre-defined route within a particular site. Therefore, in the vehicle, stopping and starting of the travel are repeated with a relatively high frequency. In addition, in the vehicle, loading/unloading doors 80A and 80B are opened and closed with a relatively high frequency for loading and unloading of the passengers. Further, the vehicle travels at a relatively low speed (for example, 30 km/h or slower).

The vehicle is, for example, an electric automobile having a drive motor as a prime motor. The vehicle is not limited to the electric automobile, and may alternatively be an automobile of another type. For example, the vehicle may be an engine automobile having an engine (internal combustion engine) as the prime motor, or a hybrid electric vehicle having the engine and the drive motor as the prime motors. Alternatively, the vehicle may be a fuel cell automobile in which the drive motor is driven by electric power generated by a fuel cell.

With reference to FIG. 1, the loading/unloading doors 80A and 80B are provided at the center of the vehicle cabin, on the left side of the vehicle. The vehicle is a vehicle for traveling on the left side of the road. The loading/unloading doors 80A and 80B are, for example, slide-type double doors, which open and close by sliding in the front-and-rear direction of the vehicle.

In addition, a plurality of passenger seats 70 are provided in the vehicle cabin along a side wall of the vehicle cabin. Moreover, on the front side of the vehicle cabin; that is, at a side nearer than the page of FIG. 1, an operation panel 71 is provided. The operation panel 71 is a panel for operating the vehicle, and, for example, when a level setting which requires a driver is selected such as the automated driving levels 0 to 4, the operation panel 71 is operated by the driver riding the vehicle. Further, a support seat 73 for the driver is provided behind the operation panel 71. In FIG. 1, the support seat 73 is shown in a folded state (stored state).

Moreover, in the vehicle cabin, as mechanisms for supporting passengers who are standing, vertical handrails 72A and 72B, and the hanging strap 10 of the present embodiment are provided. The vertical handrails 72A and 72B extend in the vehicle height direction along the side wall of the vehicle cabin. Further, upper ends of the vertical handrails 72A and 72B are connected to cross bars 74A and 74B. The cross bars 74A and 74B extend in the vehicle width direction along a ceiling 52 of the vehicle cabin.

A support 50 is provided on the ceiling 52 in addition to the cross bars 74A and 74B. More specifically, the support 50 is provided in a manner to connect the cross bars 74A and 74B provided in the vehicle front-and-rear direction. The support 50 extends in the vehicle front-and-rear direction, and has a front end connected to the cross bar 74A and a rear end connected to the cross bar 74B. The support 50 may be, for example, a pipe member made of a metal material such as aluminum.

Figure 2:
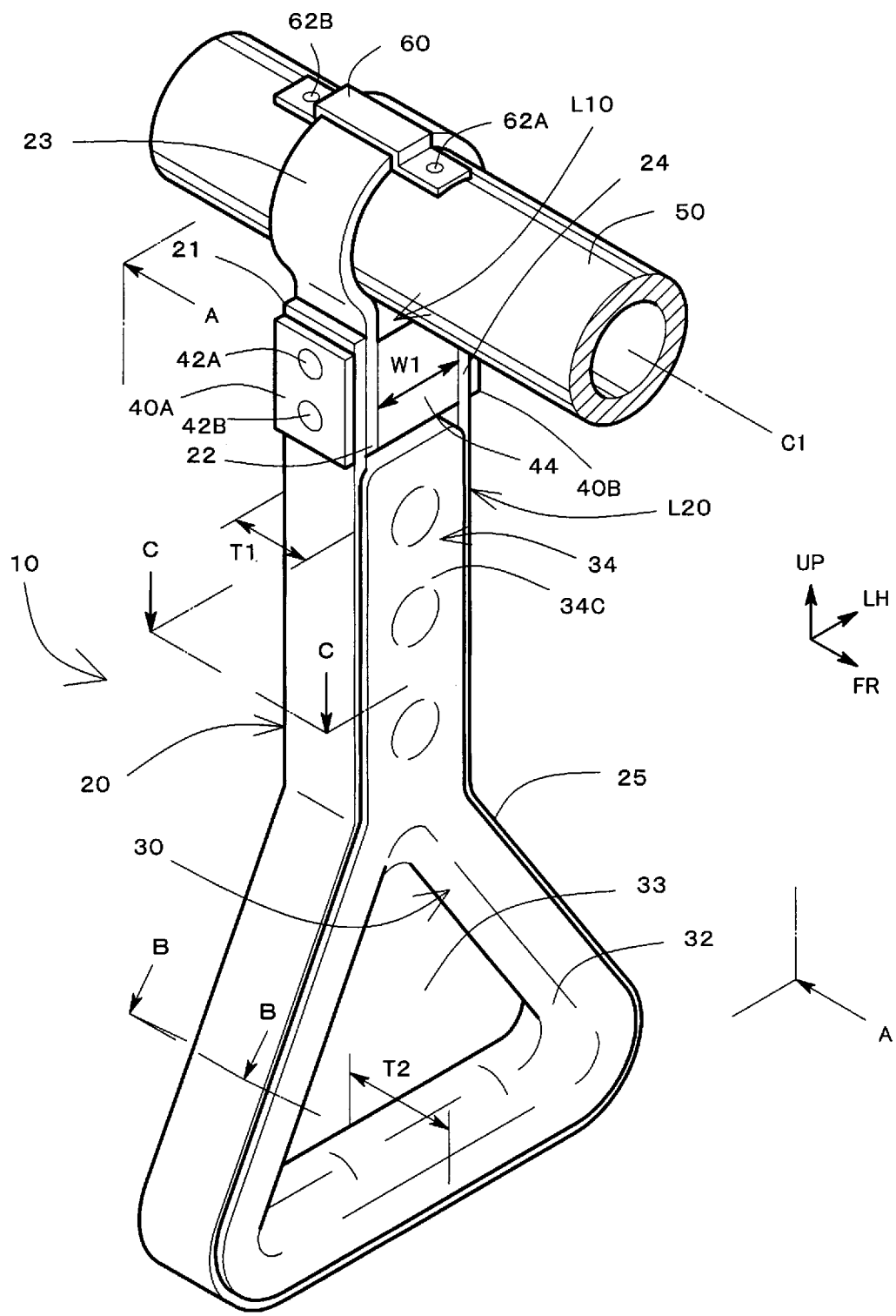
FIG. 2 is a perspective diagram exemplifying the hanging strap according to the embodiment of the present disclosure.
Figure 3:
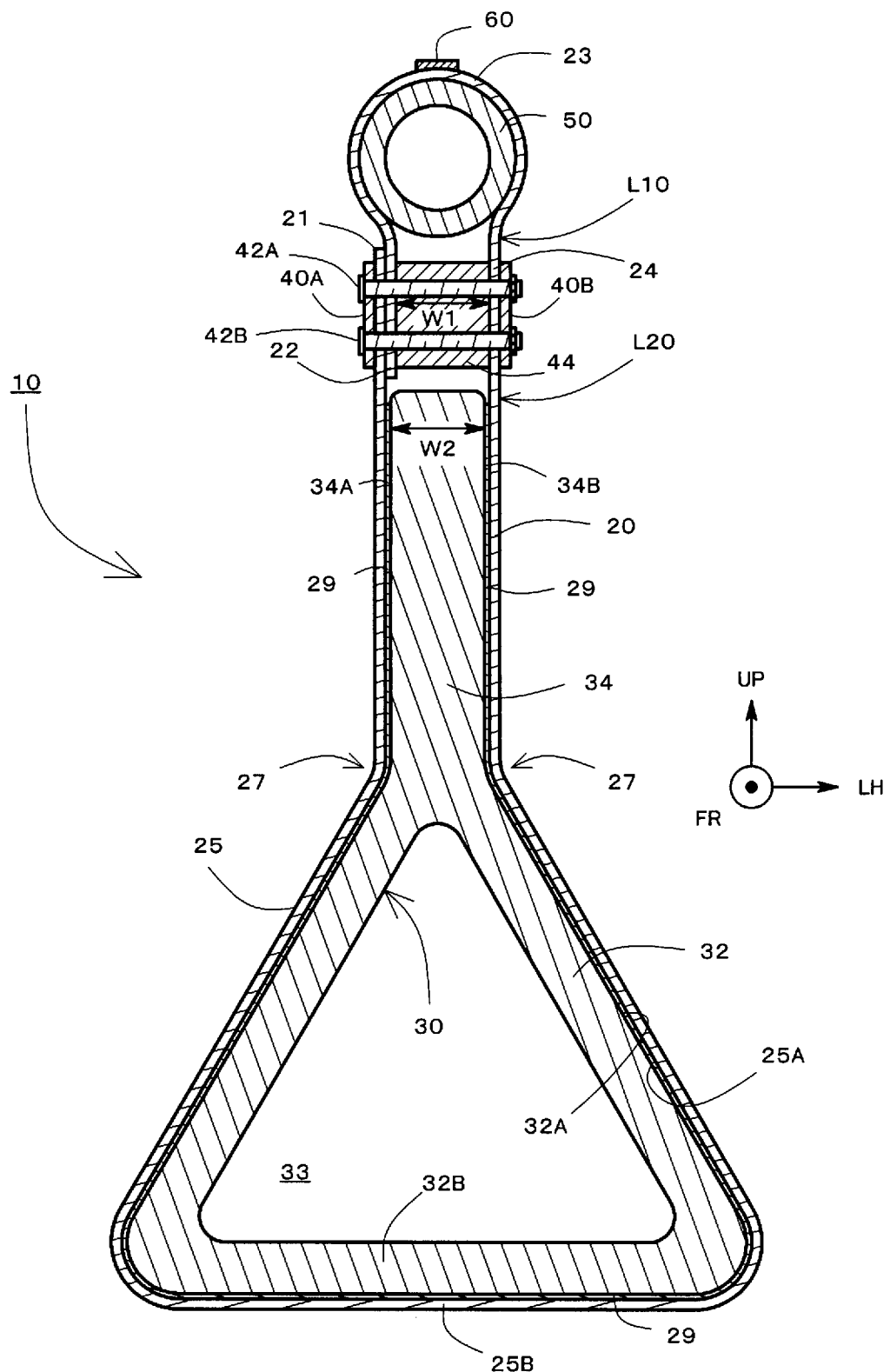
FIG. 3 is a cross sectional diagram along a line A-A of FIG. 2.
Figure 4:
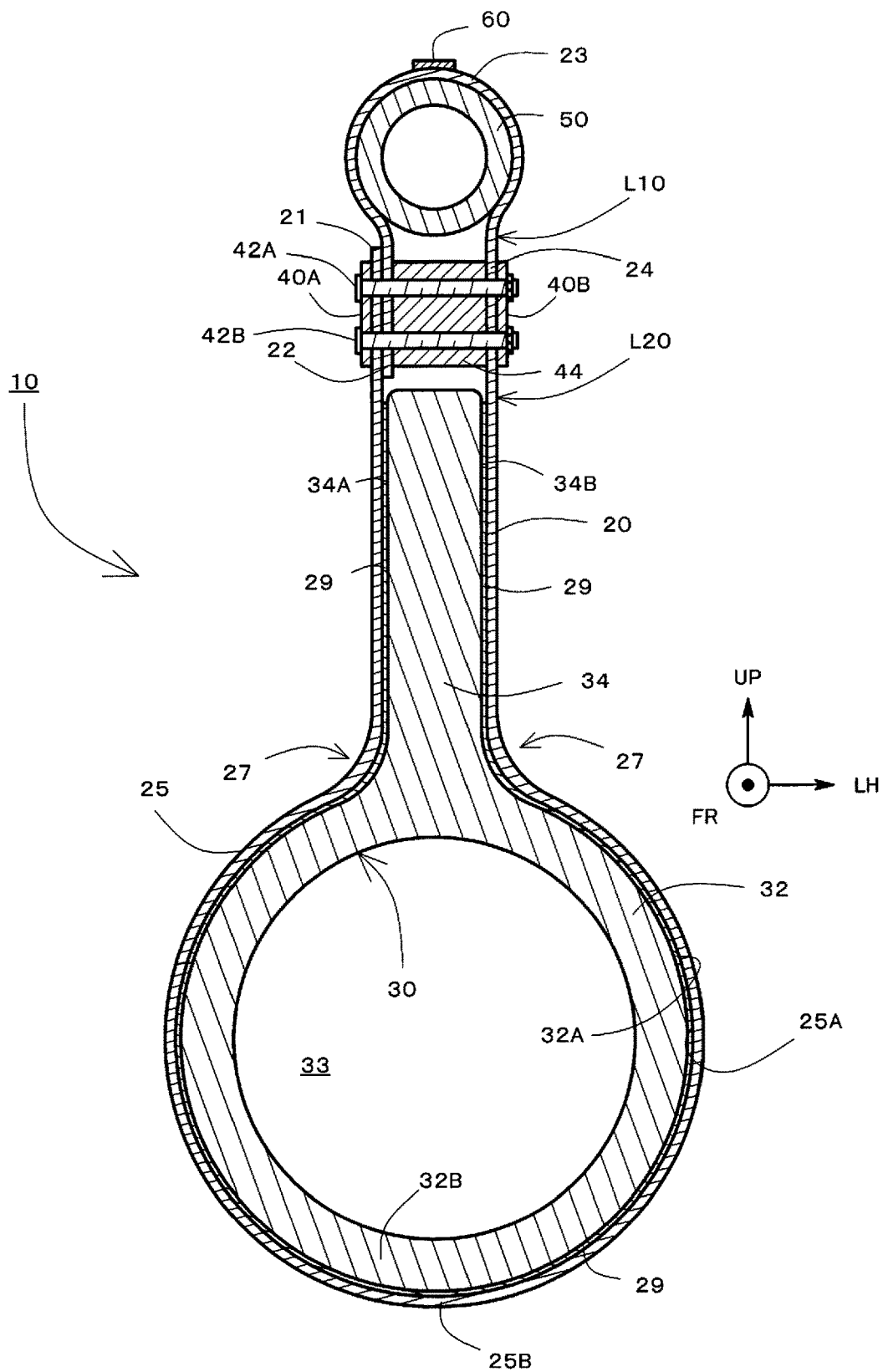
FIG. 4 is a cross sectional diagram showing another configuration of a hanging strap according to an embodiment of the present disclosure.

FIG. 2 exemplifies a perspective diagram of the hanging strap 10 according to the present embodiment, attached to the support 50. FIG. 3 exemplifies a cross sectional diagram along a line A-A of FIG. 2. The hanging strap 10 comprises a leather belt 20, a hand grip member 30, hanging strap holders 40A and 40B, a spacer 44, and a stopper 60. As exemplified in FIG. 1, a plurality of the hanging straps 10 are hung and supported on the support 50 with spaces therebetween in the vehicle front-and-rear direction.

As shown in reference to FIGS. 2 and 3, the stopper 60 is a member for preventing movement (shifting) of the hanging strap 10 in the direction of extension of the support 50. The stopper 60 is placed over a portion to be supported (supported portion) 23 of the leather belt 20 placed over the support 50. Ends of the stopper 60 are fixed on the support 50 by screws 62A and 62B.

The leather belt 20 is hung on the support 50, and supports the hand grip member 30. The leather belt 20 is a flexible member, and is formed, for example, by covering a fabric which forms a base material, with a synthetic resin. For example, in the leather belt 20, a starting end 21 and a completing end 22 of a belt of an elongated shape are overlapped, and are held by (tied by) the hanging strap holders 40A and 40B, to form a loop-shaped, endless belt.

In the leather belt 20, from the starting end 21 toward the completing end 22, the portion to be supported 23, an intermediate portion 24, and a fixation portion 25 are provided. The portion to be supported 23 is a portion through which the support 50 passes, and is an uppermost part of the leather belt 20 in a state where the hanging strap 10 is hung.

The starting end 21 and the completing end 22 are overlapped with each other and are held by screws 42A and 42B. The intermediate portion 24 is a portion opposing the starting end 21 and the completing end 22, and these three members are placed between the portion to be supported 23 and a portion where the hand grip member 30 is placed. A spacer 44 is inserted between the starting and completing ends 21 and 22, and the intermediate portion 24, and, in this state, these members are held on the hanging strap holders 40A and 40B and the screws 42A and 42B.

That is, the starting and completing ends 21 and 22, and the intermediate portion 24 are held on the hanging strap holder 40A and 40B and the screws 42A and 42B with the spacer 44 therebetween. For example, after the spacer 44 is inserted between the starting and completing ends 21 and 22, and the intermediate portion 24, these members are sandwiched by the hanging strap holders 40A and 40B. In this state, the screws 42A and 42B are screwed into the hanging strap holders 40A and 40B. With the locations of holding on the hanging strap holders 40A and 40B as a boundary, the leather belt 20 is divided into a loop L10 through which the support 50 passes and a loop L20 on which the hand grip member 30 is placed.

A width W1 of the spacer 44 (refer to FIG. 3) may be equal to a width W2 of an arm portion 34 of the hand grip member 30. The widths W1 and W2 refer to distances in a lateral direction (LH direction) orthogonal to a center axis C1 (refer to FIG. 2) of the support 50.

Figure 7:
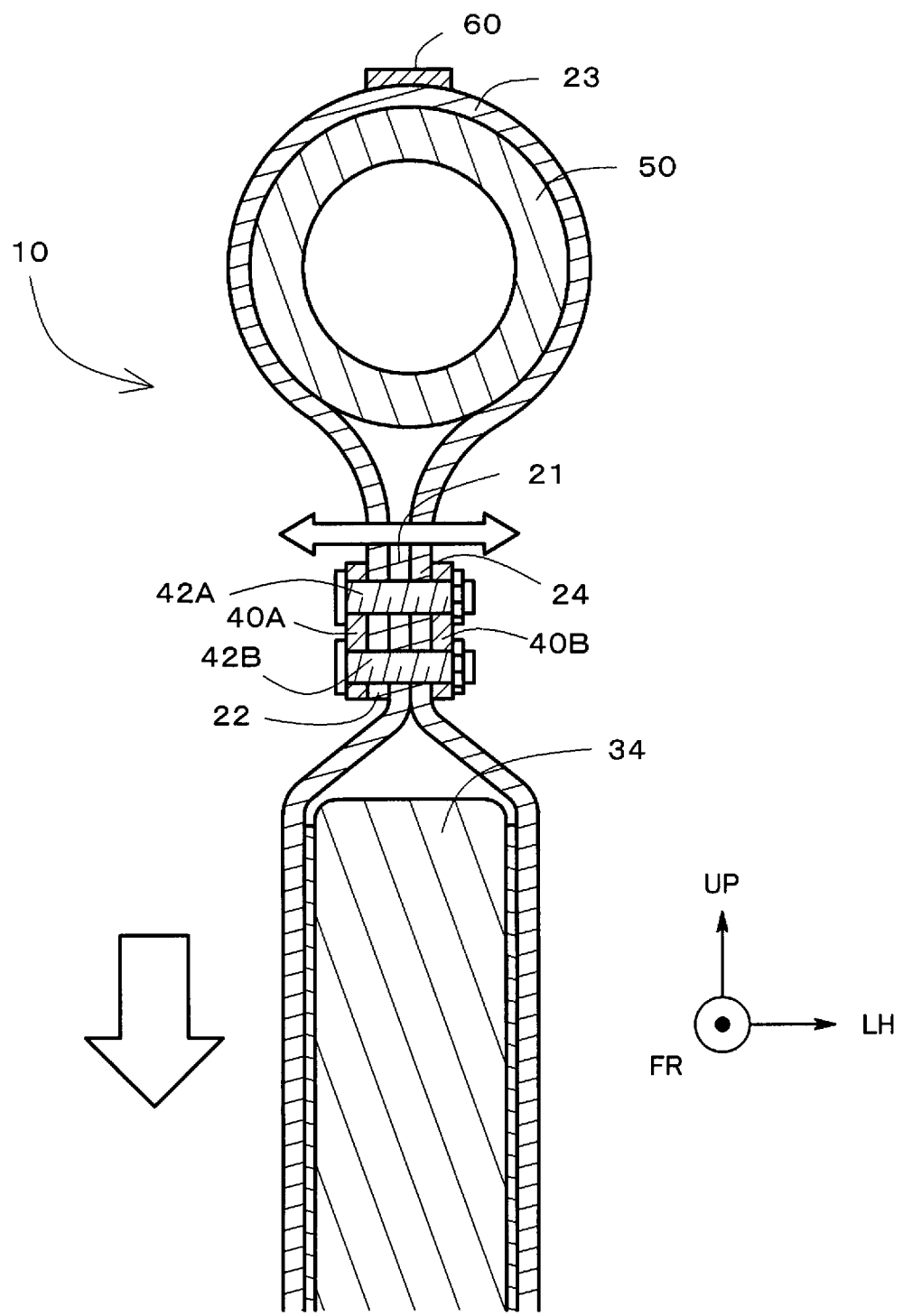
FIG. 7 is a diagram exemplifying a load applied to a screw when a spacer is not provided.

With the width W1 of the spacer 44 and the width W2 of the arm portion of the hand grip member 30 being equal to each other, a load applied to the screws 42A and 42B can be suppressed. FIG. 7 shows an example structure in which the starting end 21, the completing end 22, and the intermediate portion 24 of the leather belt 20 are fastened by the hanging strap holders 40A and 40B and the screws 42A and 42B, without providing the spacer 44.

As shown in FIG. 7, when the standing passenger grips a grip portion 32 of the hanging strap 10, a load in a vertically downward direction is applied to the hanging strap 10. At this point, a load to separate the starting and completing ends 21 and 22 from the intermediate portion 24 of the leather belt 20 is applied to the screws 42A and 42B. Because a component of the load to the screws 42A and 42B is applied in the axial directions thereof, there is a possibility that the fastening of the hanging strap holders 40A and 40B and the screws 42A and 42B are loosened, or even released.

Thus, as exemplified in FIG. 3, in the hanging strap 10 of the present embodiment, the spacer 44 is inserted between the starting and completing ends 21 and 22 and the intermediate portion 24, and the width W1 of the spacer 44 is set to be equal to the width W2 of the arm portion 34 of the hand grip member 30. Because the starting and completing ends 21 and 22 and the intermediate portion 24 are separated from each other in advance by the spacer 44, when the load in the vertically downward direction is applied on the hanging strap 10, the load in the screw axis direction, applied to the screws 42A and 42B, is suppressed. As a result, the loosening or the releasing of the fastening of the hanging strap holders 40A and 40B and the screws 42A and 42B can be suppressed.

In addition, as will be described below, an inner surface 25A of the leather belt 20 is fixed to side surfaces 34A and 34B of the arm portion 34. That is, the leather belt 20 extends along the side surfaces 34A and 34B of the arm portion 34. If the width W1 of the spacer 44 and the width W2 of the arm portion 34 are considered to be a separation distance between opposing portions of the leather belt 20, by virtue of the widths W1 and W2 being equal to each other, the leather belt 20 extends in a straight-line shape in the vehicle height direction over the spacer 44 and the arm portion 34, whereby a design advantage can be improved.

Further, as exemplified in FIGS. 2 and 3, in a state in which the starting end 21 extending from a lower part toward an upper part through the grip portion 32 and the arm portion 34 is overlapped with the completing end 22, the ends are held (fastened) on the hanging strap holders 40A and 40B and the screws 42A and 42B. In this configuration, the starting end 21 is overlapped with the completing end 22 in such a manner that the starting end 21 is at an outer side (side away from the spacer 44) in relation to the completing end 22. In other words, a break of the completing end 22 is hidden by the starting end 21, and thus, the design advantage can be improved also with this configuration.

The cases in which the width W1 of the spacer 44 and the width W2 of the arm portion 34 is equal to each other include a case in which the widths are exactly equal to each other, and, in addition, a case in which the widths are substantially equal to each other. More specifically, when there is a deviation within a tolerance range between the widths, the widths may be considered to be equal to each other.

The inner surface 25A of the fixation portion 25 of the leather belt 20 is a surface which is fixed to an outer surface 32A of the hand grip member 30. As exemplified in FIGS. 2 and 3, the fixation portion 25 is provided over the grip portion 32 and the arm portion 34 of the hand grip member 30.

For example, an adhesion layer 29 formed by an adhesive is provided between the inner surface 25A of the fixation portion 25 and the outer surface 32A of the hand grip member 30. The fixation is not limited to the adhesive, and, alternatively, the fixation portion 25 and the hand grip member 30 may be fixed to each other by welding. Because the leather belt 20 is fixed to the hand grip member 30, the shape of the leather belt 20 becomes a shape along a shape of the outer surface of the hand grip member 30.

The hand grip member 30 is supported on the leather belt 20. More specifically, the hand grip member 30 is placed at an inner circumferential side of the loop-shaped leather belt 20. As will be described later, by virtue of the hand grip member 30 being placed at the inner circumferential side of the leather belt 20, the hand grip member 30 is supported on the leather belt 20 from its outer side.

The hand grip member 30 has the grip portion 32 gripped by the standing passenger, and the arm portion 34 extending from the grip portion 32. The hand grip member 30 is, for example, a hard member formed from a resin material such as polycarbonate.

The grip portion 32 of the hand grip member 30 is a member gripped by the standing passenger, and is a ring-shaped member having an opening 33 through which a hand of the standing passenger is placed. In FIGS. 2 and 3, the grip portion 32 has a triangular shape in a front view (FR axis view), but the shape of the grip portion 32 is not limited to this shape. For example, the grip portion 32 may have a circular ring shape as exemplified in FIG. 4.

A depth T2 (refer to FIG. 2) of the grip portion 32 may be larger than a depth T1 of the leather belt 20 (T1<T2). The depths T1 and T2 are distances parallel to the center axis C1 of the support 50. In other words, the depths T1 and T2 show a width of a grip of the hanging strap 10 (grip width).

Because the depth T2 of the grip portion 32 is larger than the depth T1 of the leather belt 20, the grip portion 32 may be formed to stick out from the leather belt 20. By letting the grip portion 32 stick out from the leather belt 20, and applying curved surface machining on the grip portion 32, comfortability when the passenger grips the grip portion 32 can be improved.

As described above, the outer surface 32A of the grip portion 32 is fixed to the inner surface 25A of the fixation portion 25 of the leather belt 20. For example, an adhesive is filled between the outer surface 32A of the grip portion 32 and the inner surface 25A of the fixation portion 25, to form the adhesion layer 29 between the grip portion 32 and the fixation portion 25.

Figure 8:
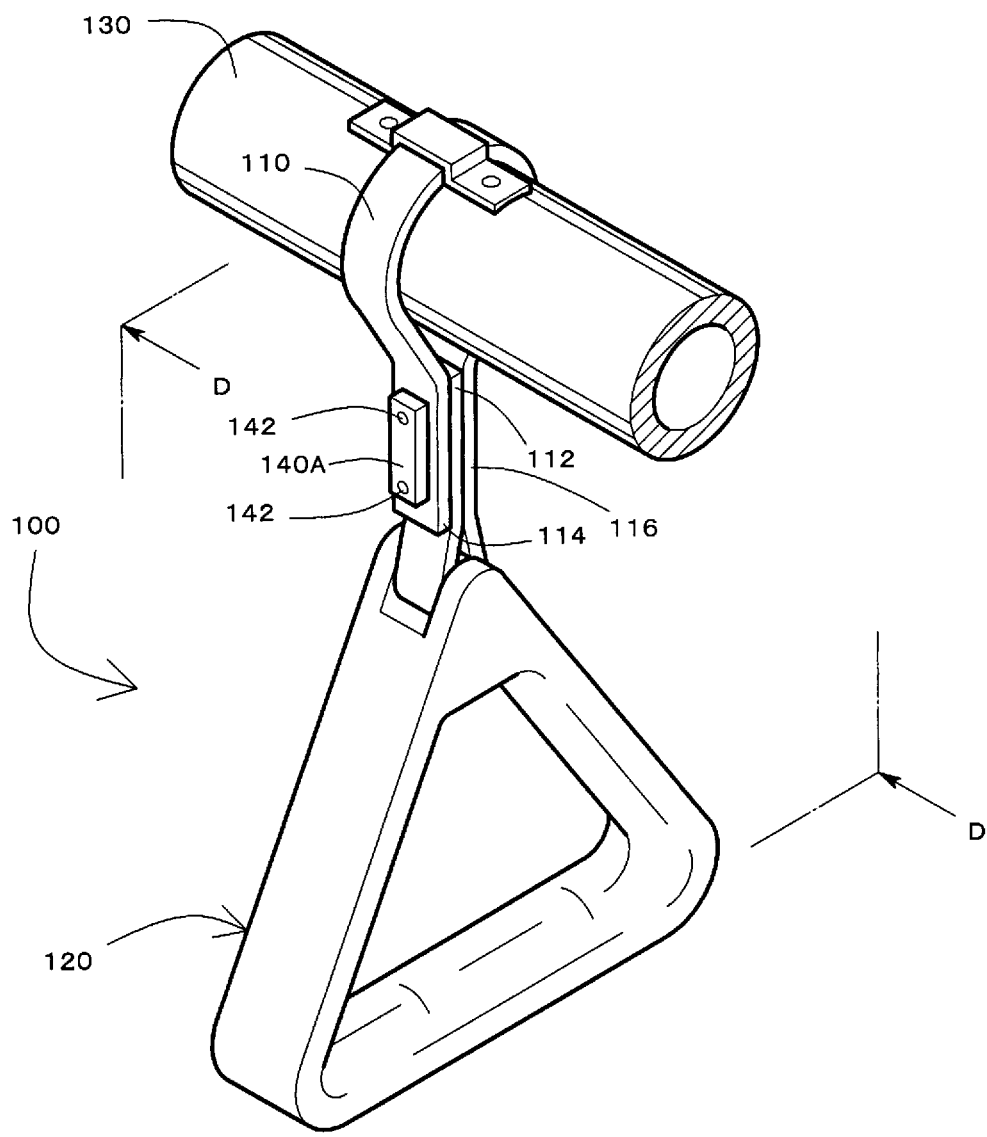
FIG. 8 is a perspective diagram exemplifying a hanging strap according to the related art.
Figure 9:
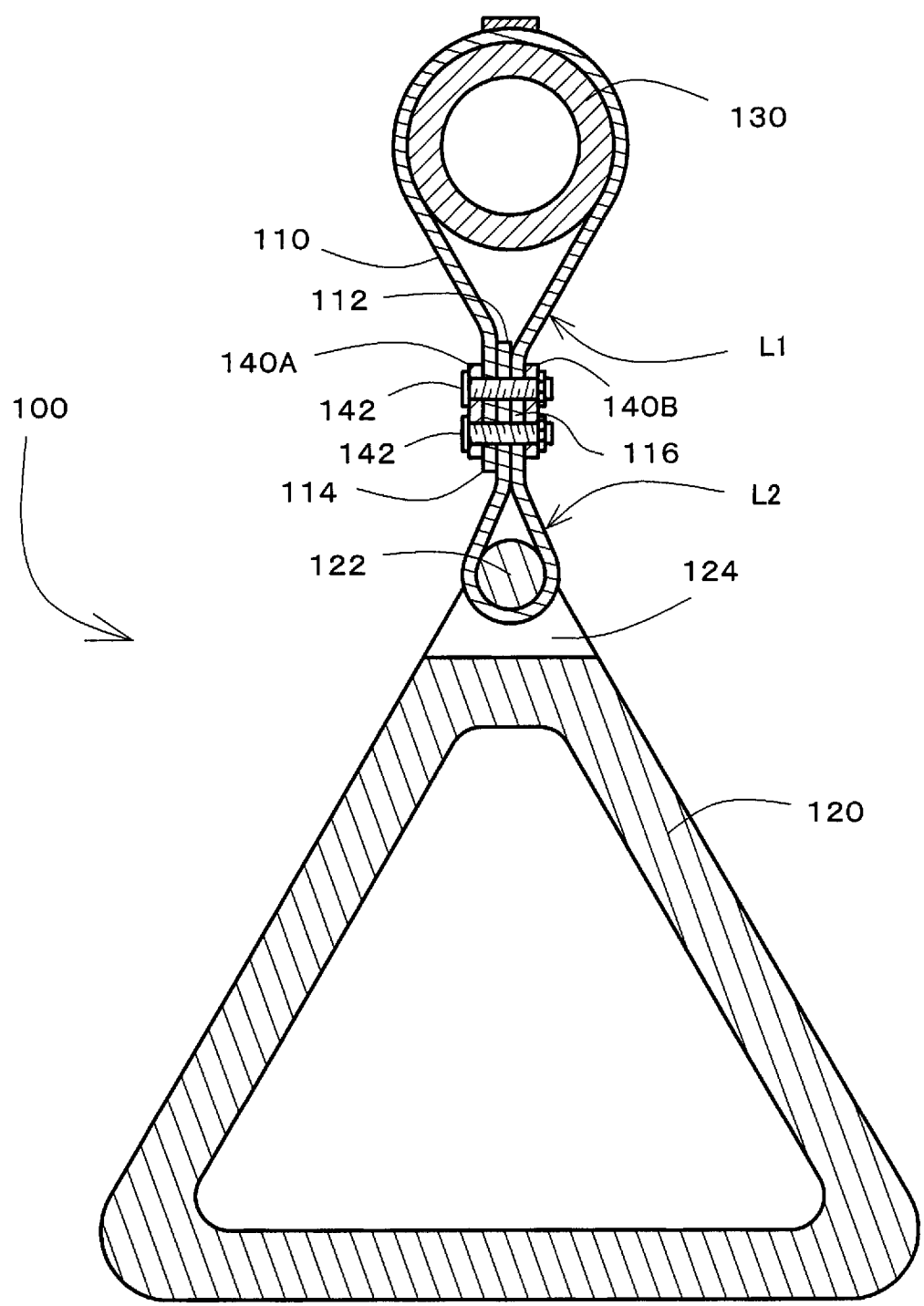
FIG. 9 is a cross sectional diagram along a line D-D of FIG. 8.

Because the outer side of the grip portion 32 is supported on the leather belt 20, and the grip portion 32 and the leather belt 20 are fixed to each other, the load which is input to the grip portion 32 can be distributed. For example, with reference to FIG. 3, when the standing passenger applies the passenger's weight on the hanging strap 10, the load is transmitted from a bottom 32B of the grip portion 32 to a bottom 25B of the fixation portion 25 of the leather belt 20. Further, at an upper part of the grip portion 32, in particular, at an inflection point 27 (refer to FIG. 3), the grip portion 32 is pulled toward the fixation portion 25, against the detachment of the fixation portion 25 of the leather belt 20 and the grip portion 32. In this manner, the load concentration on the hand grip member 30 is suppressed, as compared to, for example, the related art whose structure is shown in FIG. 8.

Figure 5:
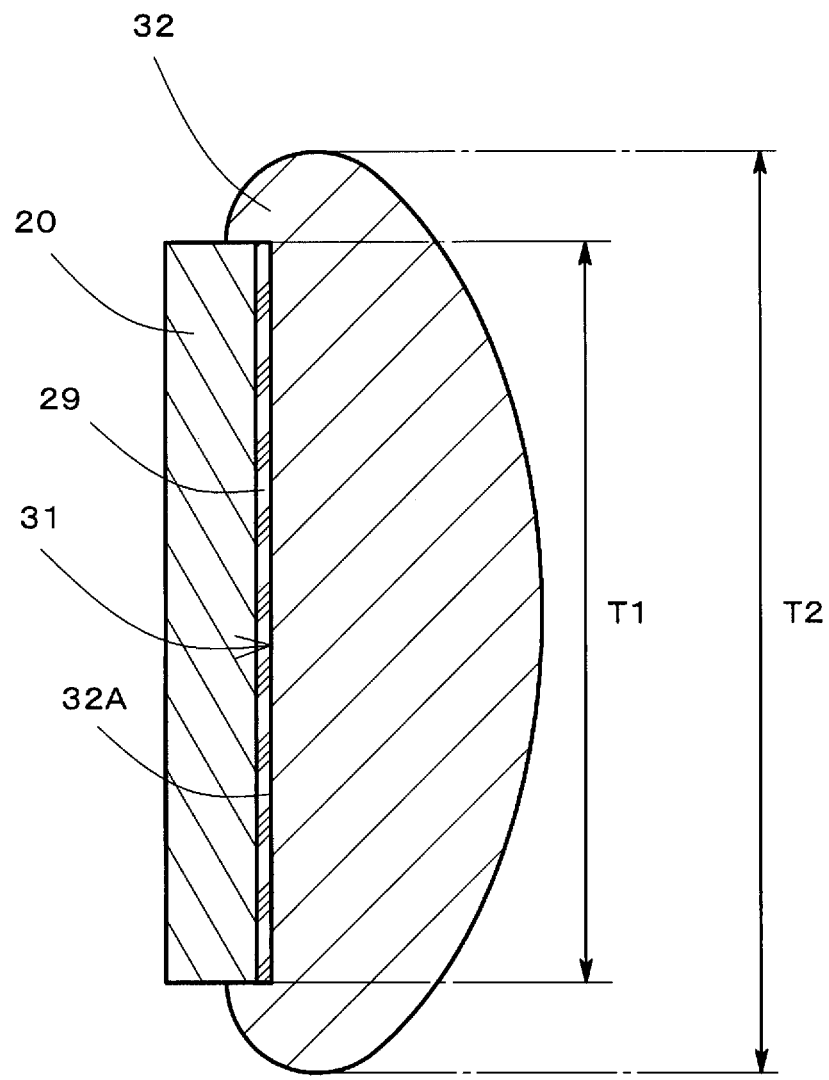
FIG. 5 is a cross sectional diagram along a line B-B of FIG. 2.

FIG. 5 exemplifies a cross section B-B of FIG. 2. As described above, the depth T2 of the grip portion 32 is larger than the depth T1 of the leather belt 20, and the grip portion 32 is formed to stick out from the leather belt 20. Taking advantage of such a shape, a guide groove 31 as exemplified in FIG. 5 may be formed on the outer surface 32A of the grip portion 32.

The guide groove 31 may be, for example, equal to the depth T1 of the leather belt 20, and has a structure in which the leather belt 20 is fitted into the guide groove 31. By fitting the leather belt 20 into the guide groove 31, detachment of the leather belt 20 from the grip portion 32 is suppressed. For example, the guide groove 31 may be formed on the outer surface of the hand grip member 30, in all regions corresponding to the fixation portion 25 of the leather belt 20.

The arm portion 34 extends from the grip portion 32 in the upward direction. In other words, the arm portion 34 extends, on the inner circumferential side of the leather belt 20, from the grip portion 32 toward the portion to be supported 23 of the leather belt 20. The arm portion 34 has a straight-line shape, and is formed, for example, with an FR-LH cross section (horizontal cross section) having a quadrangular shape.

The side surfaces 34A and 34B of the arm portion 34, opposing the leather belt 20, are fixed to the leather belt 20. For example, an adhesive is filled between the side surfaces 34A and 34B and the inner surface of the leather belt 20, to form the adhesion layer 29. By the leather belt 20 being supported on the arm portion 34, flexure (play) of the flexible leather belt 20 is reduced, and support of the standing passenger can be stabilized.

Further, with the adhesion layer 29 therebetween, the leather belt 20 would have a shape conforming with the hand grip member 30. For example, with the arm portion 34 extending in a straight-line shape, the leather belt 20 along the arm portion 34 also extends in the straight-line shape. Further, as described above, the width W1 of the spacer 44 (refer to FIG. 2) and the width W2 of the arm portion 34 are equal to each other. Thus, the leather belt 20 extends from the arm portion 34 toward the spacer 44 (vertically) in the straight-line shape. The straight-line design matches the straight-line shape of the support 50, and a high design advantage can be achieved.

Figure 6:
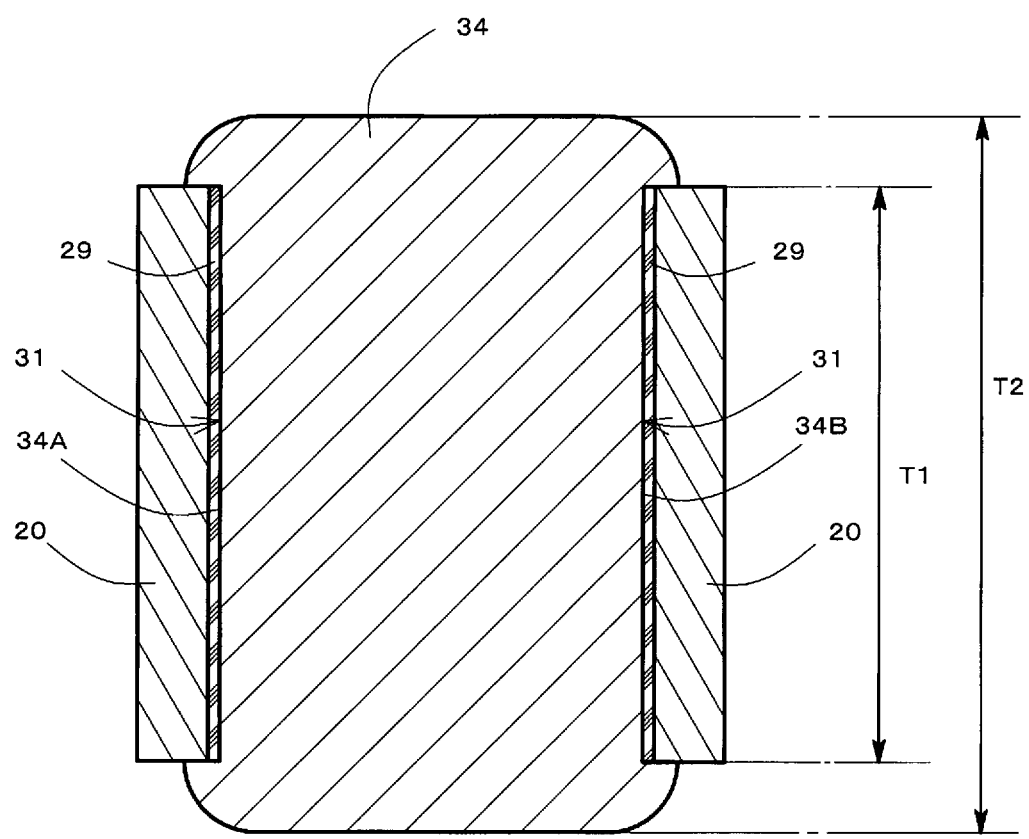
FIG. 6 is a cross sectional diagram along a line C-C of FIG. 2.

FIG. 6 exemplifies a cross section C-C of FIG. 2. The depth of the arm portion 34 may be equal to the depth T2 of the grip portion 32, and, therefore, the arm portion 34 is formed to stick out from the leather belt 20. Taking advantage of such a shape, similar to the grip portion 32, the guide groove 31 as exemplified in FIG. 6 may be formed on the side surfaces 34A and 34B which are the outer surfaces of the arm portion 34.

Similar to the grip portion 32, the guide groove 31 may be equal to the depth T1 of the leather belt 20, and has a structure in which the leather belt 20 is fitted into the guide groove 31. By fitting the leather belt 20 into the guide groove 31, detachment of the leather belt 20 from the arm portion 34 is suppressed.

An exposed surface 34C of the arm portion 34, which is not covered by the leather belt 20, may be used as a hanging strap advertisement surface on which an advertising sticker or the like is adhered. In the hanging strap of the related art, a casing for the hanging strap advertisement is attached to the leather belt 20, but in the hanging strap 10 of the present embodiment, such an additional member becomes unnecessary.

As described, in the hanging strap for the vehicle according to the present embodiment, the hand grip member 30 is placed at the inner circumferential side of the leather belt 20, and the outer surface 32A of the grip portion 32 is fixed to the inner surface 25A of the leather belt 20. With such a structure, when the load in the vertically downward direction is input from the standing passenger to the grip portion 32, the load may be received by the entire outer surface 32A of the grip portion 32 fixed to the inner surface 25A of the leather belt 20, and thus, load concentration on the hand grip member 30 can be suppressed.

In FIGS. 1-6, an example configuration is shown in which the hanging strap 10 is equipped in a bus, but alternatively, the hanging strap 10 may be equipped in a railway vehicle.

The present disclosure is not limited to the present embodiments described above, and includes all changes and modifications without departing from the technical scope or the essence of the present disclosure defined by the claims.

The invention claimed is:

1. A hanging strap for a vehicle, comprising:
a leather belt of a loop shape, that is hung from a support provided near a ceiling in a vehicle cabin; and
a hand grip member that is supported on the leather belt and that has a grip portion gripped by a standing passenger, wherein
the hand grip member is placed at an inner circumferential side of the leather belt,
an outer surface of the grip portion is fixed to an inner surface of the leather belt,
the leather belt has a portion to be supported through which the support passes,
the hand grip member has an arm portion which extends, at the inner circumferential side of the leather belt, from the grip portion toward the portion to be supported of the leather belt,
a side surface, of the arm portion, opposing the leather belt, is fixed to the inner surface of the leather belt,
the hanging strap further comprises a hanging strap holder that holds opposing portions, of the leather belt, between the portion to be supported and a portion where the hand grip member is placed, and
the opposing portions of the leather belt are held on the hanging strap holder with a spacer therebetween, the spacer being equal in width to the arm portion.

2. The hanging strap for the vehicle according to claim 1, wherein
a starting end and a completing end of the leather belt are overlapped and held by the hanging strap holder, and
the starting end of the leather belt extending in an upward direction through the grip portion and the arm portion is placed at an outer side in relation to the completing end.

3. The hanging strap for the vehicle according to claim 1, wherein
a guide groove into which the leather belt is fitted is formed on outer surfaces of the grip portion and the arm portion.

4. A hanging strap for a vehicle, comprising:
a leather belt of a loop shape, that is hung from a support provided near a ceiling in a vehicle cabin; and
a hand grip member that is supported on the leather belt and that has a grip portion gripped by a standing passenger, wherein
the hand grip member is placed at an inner circumferential side of the leather belt,
an outer surface of the grip portion is fixed to an inner surface of the leather belt,
the leather belt has a portion to be supported through which the support passes,
the hand grip member has an arm portion which extends, at the inner circumferential side of the leather belt, from the grip portion toward the portion to be supported of the leather belt,
a side surface, of the arm portion, opposing the leather belt, is fixed to the inner surface of the leather belt, and
a guide groove into which the leather belt is fitted is formed on outer surfaces of the grip portion and the arm portion.

5. A hanging strap for a vehicle, comprising:
a leather belt of a loop shape, that is hung from a support provided near a ceiling in a vehicle cabin; and
a hand grip member that is supported on the leather belt and that has a grip portion gripped by a standing passenger, wherein
the hand grip member is placed at an inner circumferential side of the leather belt,
a guide groove into which the leather belt is fitted is formed on outer surfaces of the grip portion,
an outer surface of the grip portion is fixed to an inner surface of the leather belt, and
a bottom end of the leather belt is located lower than a bottom end of a groove side wall of the guide groove disposed on both sides of the leather belt.

6. A hanging strap for a vehicle, comprising:
a leather belt of a loop shape, that is hung from a support provided near a ceiling in a vehicle cabin; and
a hand grip member that is supported on the leather belt and that has a grip portion gripped by a standing passenger, wherein
the hand grip member is placed at an inner circumferential side of the leather belt,
the leather belt has a portion to be supported through which the support passes,
the hand grip member has an arm portion which extends, at the inner circumferential side of the leather belt, from the grip portion toward the portion to be supported of the leather belt,
the hanging strap further comprises a hanging strap holder that holds opposing portions, of the leather belt, between the portion to be supported and a portion where the hand grip member is placed, and
the opposing portions of the leather belt are held on the hanging strap holder with a spacer therebetween, the spacer being equal in width to the arm portion.

7. A hanging strap for a vehicle, comprising:
a leather belt of a loop shape, that is hung from a support provided near a ceiling in a vehicle cabin; and
a hand grip member that is supported on the leather belt and that has a grip portion gripped by a standing passenger, wherein
the hand grip member is placed at an inner circumferential side of the leather belt,
the leather belt has a portion to be supported through which the support passes,
the hand grip member has an arm portion which extends, at the inner circumferential side of the leather belt, from the grip portion toward the portion to be supported of the leather belt, and
a guide groove into which the leather belt is fitted is formed on outer surfaces of the grip portion and the arm portion.

* * * * *